US012299655B2

(12) United States Patent
Kurian et al.

(10) Patent No.: US 12,299,655 B2
(45) Date of Patent: May 13, 2025

(54) ATM LEVERAGING EDGE DEVICES FOR ALTERNATIVE DATA ROUTING

(71) Applicant: Bank of America Corporation, Charlotte, NC (US)

(72) Inventors: Manu Kurian, Dallas, TX (US); Siten Sanghvi, Jersey City, NJ (US); Heather Dolan, Sarasota, FL (US); George Albero, Charlotte, NC (US); Maharaj Mukherjee, Poughkeepsie, NY (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 280 days.

(21) Appl. No.: 17/885,610

(22) Filed: Aug. 11, 2022

(65) Prior Publication Data

US 2024/0054464 A1 Feb. 15, 2024

(51) Int. Cl.
*G06Q 40/00* (2023.01)
*G06Q 20/10* (2012.01)
(Continued)

(52) U.S. Cl.
CPC ....... *G06Q 20/1085* (2013.01); *G06Q 20/321* (2020.05); *G06Q 20/3223* (2013.01);
(Continued)

(58) Field of Classification Search
CPC .................. G06Q 20/1085; G06Q 20/3223
See application file for complete search history.

(56) References Cited

U.S. PATENT DOCUMENTS 8,078,518 B2   12/2011   Goertz et al.
8,185,457 B1   5/2012   Bear et al.
(Continued)

FOREIGN PATENT DOCUMENTS

| CN | 104346200 | * | 2/2015 | ......... G06Q 20/1085 |
| JP | 2004-15222 | * | 5/2004 | ............. G06Q 20/18 |
| WO | WO2019/220310 | | 11/2019 | |

OTHER PUBLICATIONS

Feng et al., "Computation offloading in mobile edge computing networks: A survey," Journal of Network and Computer Applications, 202, 2022 (Year: 2022).*
(Continued)

*Primary Examiner* — Abhishek Vyas
*Assistant Examiner* — William B. Bunker
(74) *Attorney, Agent, or Firm* — Weiss & Arons LLP (57) ABSTRACT

A method enabling processing electronic transactions received at the ATM when network connection with the central server is disrupted. The method may enable processing each electronic transaction received using an alternative data routing pathway. The alternative data routing pathway may leverage one or more edge devices within close proximity to the ATM to serve as a proxy for transmitting data to the central server. The one or more edge devices may be enabled to carry electronic transaction data from electronic transactions processed locally at the ATM to a location where a network connection between the one or more edge devices and the central server may be established. When in a location including network connection, the one or more edge devices may transmit the electronic transaction data to the central server.

13 Claims, 8 Drawing Sheets

(51) Int. Cl.
*G06Q 20/32* (2012.01)
*G07F 19/00* (2006.01)

(52) U.S. Cl.
CPC ....... *G06Q 20/3278* (2013.01); *G07F 19/206* (2013.01); *G07F 19/208* (2013.01); *G07F 19/211* (2013.01)

(56) References Cited

U.S. PATENT DOCUMENTS

| | | | |
|---|---|---|---|
| 8,281,985 | B1 | 10/2012 | Steinmetz et al. |
| 8,548,904 | B1 | 10/2013 | Bear et al. |
| 8,996,613 | B2 | 3/2015 | Fan |
| 10,467,604 | B1* | 11/2019 | Dorsch ................ G07F 19/20 |
| 11,526,865 | B2 | 12/2022 | Goodman et al. |
| 2007/0288382 | A1 | 12/2007 | Narayanan et al. |
| 2010/0280871 | A1 | 11/2010 | Goertz et al. |
| 2011/0202466 | A1 | 8/2011 | Carter |
| 2012/0196586 | A1* | 8/2012 | Grigg ...................... H04B 5/72 455/39 |
| 2012/0208557 | A1 | 8/2012 | Carter |
| 2014/0324689 | A1 | 10/2014 | Pinault |
| 2015/0046325 | A1* | 2/2015 | McCracken ............ G06F 9/452 705/43 |
| 2016/0098700 | A1 | 4/2016 | Johnson et al. |
| 2016/0180307 | A1 | 6/2016 | Laracey |
| 2017/0053252 | A1 | 2/2017 | Votaw et al. |
| 2017/0262844 | A1* | 9/2017 | Laracey ................ G06F 21/335 |
| 2017/0344962 | A1 | 11/2017 | Agrawal et al. |
| 2018/0068297 | A1* | 3/2018 | Goodman ............ G06Q 20/401 |
| 2019/0087817 | A1 | 3/2019 | Adari |
| 2019/0140935 | A1 | 5/2019 | Kikinis |
| 2019/0180259 | A1 | 6/2019 | Deluca et al. |
| 2019/0288934 | A1* | 9/2019 | Chakra ................. H04L 45/12 |
| 2019/0347631 | A1* | 11/2019 | Mossoba ............. G06Q 20/382 |
| 2020/0175488 | A1 | 6/2020 | Kulpati et al. |
| 2020/0186355 | A1 | 6/2020 | Davies |
| 2020/0364989 | A1* | 11/2020 | Benkreira ............ G07F 19/206 |
| 2020/0394626 | A1 | 12/2020 | Kikinis et al. |
| 2020/0402065 | A1* | 12/2020 | Kapur ................ G06Q 20/3278 |
| 2021/0035101 | A1* | 2/2021 | Pham ................. G06Q 20/3221 |
| 2021/0073804 | A1 | 3/2021 | Kikinis |
| 2021/0090044 | A1* | 3/2021 | Edwards ............... G06F 21/602 |
| 2021/0224813 | A1 | 7/2021 | Post |
| 2021/0304165 | A1 | 9/2021 | Deluca et al. |
| 2021/0409956 | A1 | 12/2021 | Wagner |
| 2022/0094764 | A1* | 3/2022 | Kim ........................ H04L 67/63 |
| 2022/0138746 | A1* | 5/2022 | Rodriguez ............ G07F 19/211 705/43 |
| 2022/0277306 | A1 | 9/2022 | Levitt et al. |
| 2022/0398883 | A1* | 12/2022 | Belew ................. H04W 12/033 |
| 2023/0028324 | A1 | 1/2023 | Kikinis et al. |
| 2023/0297998 | A1 | 9/2023 | Yang et al. |
| 2023/0306430 | A1 | 9/2023 | Post |
| 2023/0319664 | A1 | 10/2023 | Arora et al. |
| 2024/0013190 | A1 | 1/2024 | Dolan et al. |
| 2024/0054464 | A1 | 2/2024 | Kurian et al. |

OTHER PUBLICATIONS

Google Cloud, "Architecting disaster recovery for cloud infrastructure outages," The Wayback Machine—https://web.archive.org/web/20220610143117, Jun. 10, 2022 (Year: 2022).*

Long et al., "Computation offloading through mobile vehicles in IoT-edge-cloud network," EURASIP Journal on Wireless Communications and Networking, 2020 (Year: 2020).*

Sridharan et al., "New Generation ATM Terminal Services," International Conference on Computer Communication and Informatics, 2016 (Year: 2016).*

Uddinn et al., "The mCard approach for Bangladesh," 16th International Conference on Computer and Information Technology, 2014 (Year: 2014).*

Solomon et al., Design of a Customer-Centric Surveillance System for ATM Banking Transactions Using Remote Certification Technique, Feb. 23, 2021, 2020 IEEE $2^{nd}$ International Conference on Cyberspace, pp. 104-111 (Year: 2021).

* cited by examiner

ATM LEVERAGING EDGE DEVICES FOR ALTERNATIVE DATA ROUTING

FIELD OF TECHNOLOGY

Aspects of the disclosure relate to facilitating communication between an ATM and a central server leveraging edge devices.

BACKGROUND OF THE DISCLOSURE

An automated teller machine ("ATM") is used widely by customers associated with an entity of the ATM for performing basic transactions. Customers may be enabled to view account information and perform transactions and withdrawals at the ATM.

The ATM typically is in direct communication with a central server when performing each transaction. However, sporadic loss of network connection does occur and the ATM may not be able to connect to the central server to process and complete transactions. It would be desirable, therefore, for the ATM to store account data of customers of a financial entity that is associated with the ATM within a local data repository at the ATM, and to continually retrieve account data from the central server keeping the locally stored customer database updated.

In addition, when users attempt to perform a transaction at the ATM and network connection is not established, it would be further desirable to enable the ATM to process these transactions locally at the ATM, update the account data stored locally and store the processed transactions pending a re-establishment of network connection.

Because, in certain circumstance, network connection between the ATM and the central server may be disconnected for longer than a few moments, it would be further desirable to enable an alternative data routing pathway for transmission of transactions to the central server.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A method for enabling an automated teller machine ("ATM") supporting a default routing pathway, to leverage an alternative data routing pathway using edge devices for transmitting information to a central server. The method may be enabled when the ATM does not support a wireless network connection. The network connection may be a wireless network connection between the ATM and the central server. In some embodiments the network connection may be an internet connection. The method may include a processor on the ATM executing the steps.

The method may include detecting a loss of network connection between the ATM and the central server. In response to a detection that the ATM does not support the network connection, the method may include processing electronic transaction requests received at the ATM using offline electronic transaction protocols.

The offline electronic transaction protocols may include authorizing the user and/or device performing the transaction. The authorizing may include receiving input of the user's password and/or biometric data and comparing it to authentication data associated with the user that may be stored within the customer account database. The customer account database is stored at the central server. Additionally, the customer account database may be stored at the ATM in a local data repository. When the network connection between the ATM and the central server is established, the ATM may continuously update the customer account database by retrieving the data from the central server.

The offline electronic transaction protocols may also include, in response to the authorizing, processing the transaction by updating the user's account and any additional account included in the transaction based on the request and storing the electronic transaction data in an offline electronic transaction file.

The method may also include storing in the local data repository, offline transaction data associated with each processed offline electronic transaction and marking a status for each offline transaction data as 'pending online.'

Each offline transaction data may include account data for the accounts associated with the transaction. Each offline transaction data may also include a transaction number, a timestamp when the request was processed, a transaction status of 'online pending' and a value of the transaction.

The local data repository within the ATM may include a customer account database. The customer account database may include account data for each customer of an entity associated with the ATM. The customer account database may include account data for any customer that uses the ATM. The processor may continuously retrieve account data for each customer from the central server and update the local customer account database.

Maintaining a customer account database at the ATM may enable the ATM to perform transactions even when network connection has been disrupted.

Each transaction that is processed when network connection is disrupted, is processed at the ATM and stored within the local data repository in a customer account database. Additionally, the customer account associated with the transactions may be updated based on the transaction processed.

The ATM may, at periodic intervals, re-attempt to establish the network connection with the central server. When network connection is re-established, electronic transactions may be directed via the default routing pathway. The default routing pathway may be the standard mode of processing electronic transactions at any ATM.

To enable processing electronic transactions received at the ATM when the network connection is disrupted, the method may process each electronic transaction received using the alternative data routing pathway.

The alternative data routing pathway may leverage one or more edge devices within close proximity to the ATM to serve as a proxy for transmitting data to the central server. The one or more edge devices may be enabled to communicate with the ATM via a short-range communication in order to receive transaction data from the ATM. Short-range communication may include one of Bluetooth®, near-field communication ("NFC"), ZigBee light-fidelity ("Lifi") and any other suitable short-range communication.

The one or more edge devices may be enabled to carry electronic transaction data from electronic transactions processed locally at the ATM to a location where the edge device may be enabled to establish a network connection with the central server via the secure application. When in a location where network connection may be established between the mobile device and the central server, the one or more mobile devices may transmit the electronic transaction data to the central server.

Edge devices, described herein as mobile devices, may be one of a smart card, smartphone, smartwatch, smart glasses, smart car or any other suitable edge device.

The method may include searching, using short-range wireless communication, for a mobile device within a pre-determined range of the ATM. The searching may include leveraging Beacon signals, radio waves, Lifi signals, or any other suitable method of transmitting electronic messages to mobile devices within short-range.

The method may also include, in response to an identification of the mobile device within the pre-determined range, transmitting a pairing request to the mobile device requesting the mobile device to allow the ATM to connect.

The pre-determined range may be a range within a pre-determined proximity to the ATM. The pre-determined proximity may be a distance that enables the transmitting of the batch file using short-range communication.

In response to a receipt of authentication of the request, the method may include determining if the mobile device is running a secure application on the mobile device. The secure application may be associated with an entity of the ATM. The secure application may be an application that provides access to a service associated with the entity.

When the mobile device is determined to run the secure application, the method may include requesting an approval from the mobile device to perform as a transaction transmission intermediary. When the mobile device accepts to operate as the transaction transmission intermediary, the mobile device may be the mediator for transmitting electronic transaction data generated at the ATM to be transmitted to the central server when the ATM is not enabled to connect to the central server.

The requesting of the approval may include transmitting a notification to the mobile device. The notification may include displaying a selectable option to accept or deny the request. The notification may be displayed via the secure application running on the mobile device. The notification may be displayed on a UI of the mobile device.

In some embodiments, the requesting of approval may include accessing an account profile of the user of the mobile device. The method may further include, determining, based on the setting in the account profile, whether a selectable option to pre-sign in to being the transaction transmission intermediary has been selected.

In response to a receipt of approval from the mobile device, the method may include compiling a batch file to be transmitted to the mobile device. The compiling may include determining an amount of available storage at the mobile device. In some embodiments, the amount of available storage at a mobile device may be determined based on the type of mobile device. When the mobile device is a smaller mobile device, i.e. —a smartwatch or smart card, data storage space available at the device may be minimal. When the mobile device is a larger device, i.e. —a smart car, data storage space available at the device may be much greater than the smaller mobile devices.

The method may include generating a batch file including the offline transaction data stored in the local data repository from each processed offline electronic transaction. The size of the batch file may be no greater than the amount of available storage on the mobile device. The method may include inserting each offline electronic transaction data into the batch file until there is insufficient space in the batch file. In some embodiments, the batch file may be enabled to include all offline electronic transaction data from the ATM that is waiting to be uploaded to the central server. In other embodiments, the batch file may be enabled to include a partial amount of the data due to insufficient space.

In some embodiments, when the mobile device does not have enough storage space for all the offline transaction data, the method may include, splitting the batch file into two or more batch files. One batch file may be transmitted to the mobile device. The additional two or more batch files may be transmitted to an additional one or more mobile devices identified within the pre-determined range.

The method may further include assigning a batch file identifier to the batch file.

The compiling may further include tagging to the batch file, the batch file identifier. The compiling may further include tagging to the batch file, a device identifier associated with the mobile device that may be the proxy for transmitting the offline transaction data to the central server. The device identifier may be a MAC address of the mobile device. The device identifier may be a registered name of the mobile device. The device identifier may be any suitable identifier that is unique to the mobile device. This device identifier may enable the central server, upon receipt of the offline transaction data, to determine whether the offline transaction data is new or is a duplicate.

The method may include storing a copy of the batch file at the local data repository and tagging the copy of the batch file with the device identifier and the batch file identifier.

The method may further include transmitting the batch file to the mobile device. In some embodiments, the method may include encrypting the batch file prior to transmitting to the mobile device. The encrypting of the data may ensure the secure storage, by the mobile device, of sensitive information included in the transmission.

When the ATM is enabled to re-establish network connection with the central server, the copy of the batch file may be automatically uploaded to the central server. The copy of the batch file transmitted from the ATM may be tagged with the device identifier and the batch file identifier. Thereby, when both the mobile device and the ATM upload the batch file, the central server may be enabled to make a determination of duplication based on the device identifier and the batch file identifier.

The central server may be configured to determine duplication by comparing the batch file identifier and the device identifier that is tagged to each batch file. Based on the comparison, the central server may determine whether the file is a duplicate.

In some embodiments, when compiling the batch file, offline transaction data may be inserted into the batch file in order of the value of each transaction. The transaction comprising the greatest transaction value may be the first transaction to be processed at the central server. In some embodiments, the offline transaction data may be inserted into the batch file based on the timestamp. The oldest transaction may be the first in the batch file which may enable the oldest transaction to be processed first at the central server.

In some embodiment the mobile device may deny the request for approval of operating as the transaction transmission intermediary. In response to a receipt of a denial to the request, the method may include the ATM searching for another mobile device within the pre-determined range.

In some embodiments, following the searching of the pre-determined range for one or more mobile devices to operate as the transaction transmission intermediary, the method may include identifying the mobile device and an additional one or more mobile devices within the pre-determined range. The method may further include requesting approval from the mobile device and the additional one or more mobile devices to perform as the transaction transmission intermediary.

In response to receipt of approval from the mobile devices and the additional one or more mobile devices, the method may include transmitting the batch file to the mobile device and the additional one or more mobile devices. When the same batch file is transmitted to more than one mobile device the batch file identifier may be the same identifier for each of the batch files. When the batch file is split into two or more batch files, each batch file may be assigned a different identifier. This may enable the central server accurately determining whether a batch file is a duplicate of a previously received batch file from either the ATM or another mobile device.

In some embodiments, the batch file may be the same batch file transmitted to each mobile device. In some embodiments, based on available storage at each of the mobile devices, the batch file may be split into two or more batch files.

When the size of the batch file is greater than the amount of available storage, the method may include, splitting the batch file into a first batch file and a second batch file. The method may include splitting the batch file into a first, second, third or more batch files.

The method may further include transmitting the first batch file to the mobile device. The method may further include transmitting the second batch file to the additional one or more mobile devices.

In some embodiments, the method may include identifying a first mobile device. The method may further include determining that the mobile device does not have sufficient storage for all the offline transaction data that is pending. When the mobile device does not have sufficient storage space, the method may further include searching the pre-determined range for an additional mobile device.

Following the identifying of the additional mobile device, the method may include requesting approval from the additional mobile device to perform as the transaction transmission intermediary. In response to receipt of approval from the additional mobile device, the method may include splitting the offline transaction data into two batch files. The method may include transmitting the first batch file to the mobile device and further transmitting the second batch file to the additional mobile device.

Following a transmitting of the first batch file and the second batch file to the central server when network connection is re-established, the method may include, via the central server, determining, based on the device identifier tagged to the offline transaction data, whether the batch file is a duplicate batch file.

A system for enabling an automated teller machine ("ATM") supporting a default routing pathway, to leverage an alternative data routing pathway using edge devices for transmitting information to a central server when the ATM does not support a network connection is provided.

The ATM may be configured to detect a loss of the network connection between the ATM and the central server. The ATM may be further configured to process electronic transaction requests at the ATM using offline electronic transaction protocols. Following the processing of electronic transaction requests at the ATM, the ATM may be configured to store in a local data repository, offline transaction data associated with each processed offline electronic transaction.

When the ATM does is not able to support the wireless network connection with the central server, the ATM may be configured to search, using short-range wireless communication, for a mobile device within a pre-determined range of the ATM. The mobile device may be enabled to provide transmission of offline electronic transaction data stored at the ATM to the central server while network connection between the ATM and the central server may not be established.

It should be appreciated that in some embodiments, the short-range wireless communication may include a bandwidth that may enable transmission of the batch file within a pre-determined amount of time.

In response to an identification of a mobile device within the pre-determined range, the ATM may be enabled to transmit a first request to the mobile device. The first request may be a pairing request. The pairing request may request the mobile device to allow the ATM to electronically communicate with the mobile device.

The mobile device may be configured to receive the pairing request. The mobile device may be further configured to transmit an electronic communication to the ATM authenticating the pairing request and further transmitting a device identifier associated with the mobile device to the ATM.

The ATM may be configured to determine whether the mobile device is running a secure application on the mobile device. The secure application may be associated with an entity of the ATM.

In response to the determination that the mobile device is running the secure application, the ATM may be configured to transmit a second request to the mobile device. The second request may be an approval request that is requesting approval from the mobile device to perform as a transaction transmission intermediary.

In response to a receipt of approval, the ATM may be configured to compile a batch file for transmitting to the mobile device.

The compiling may include determining an amount of available storage at the mobile device. The compiling may further include generating a batch file including the offline transaction data stored in the local data repository from each processed offline electronic transaction.

It should be appreciated that a size of the batch file may be no greater than the amount of available storage on the mobile device.

The ATM may assign a batch file identifier to the batch file. The ATM may be further configured to tag to the batch file, the batch file identifier and a device identifier associated with the mobile device.

The ATM may be further configured to store a copy of the batch file at the local data repository and further tagging to the copy of the batch file, the batch file identifier and the device identifier.

The ATM may be further configured to transmit the batch file to the mobile device.

Upon receipt of the batch file at the mobile device, the mobile device may be configured to temporarily store the batch file at the mobile device while network connection with the central server is not supported at the mobile device.

When in a location comprising an enablement to connect to the network, the mobile device may be configured to establish network connection with the central server, via the secure application, and transmit the batch file to the central server.

In some embodiments, following the mobile device transmitting the batch file to the central server, the mobile device may be configured to return to the pre-determined range of the ATM. The mobile device, upon return, may be configured to transmit an electronic communication to the ATM notifying the ATM of the transmission of the batch file to the central server. The ATM may be enabled, upon receipt of the electronic communication, update the local data repository. The ATM may be further enabled to synchronize the data included in the batch file.

When a user performs a transaction at the ATM, the user may utilize a mobile device to access the user's account. The mobile device may be a credit card, debit card, smartphone or any other suitable device. It should be appreciated, that in some embodiments, the smartphone and/or the card may be enabled to store sufficient data associated with the user's account at the device itself. The data may be stored from a previous action performed at the device. The data may include credit information, latest balance and a trust score. The trust score may be enabled to be established from a previous merchant tap which may enable establishing trust at the ATM when network connection may not be established between the ATM and the central server to authorize the device.

Each time the device performs a transaction at a point of sale, the device may be updated with current information and may further receive a timestamp and previously stored information may be overwritten.

When the user approaches the ATM when a network connection may not be established, the ATM may authenticate the device based on the data stored at the device and retrieve updated account balance from the device.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
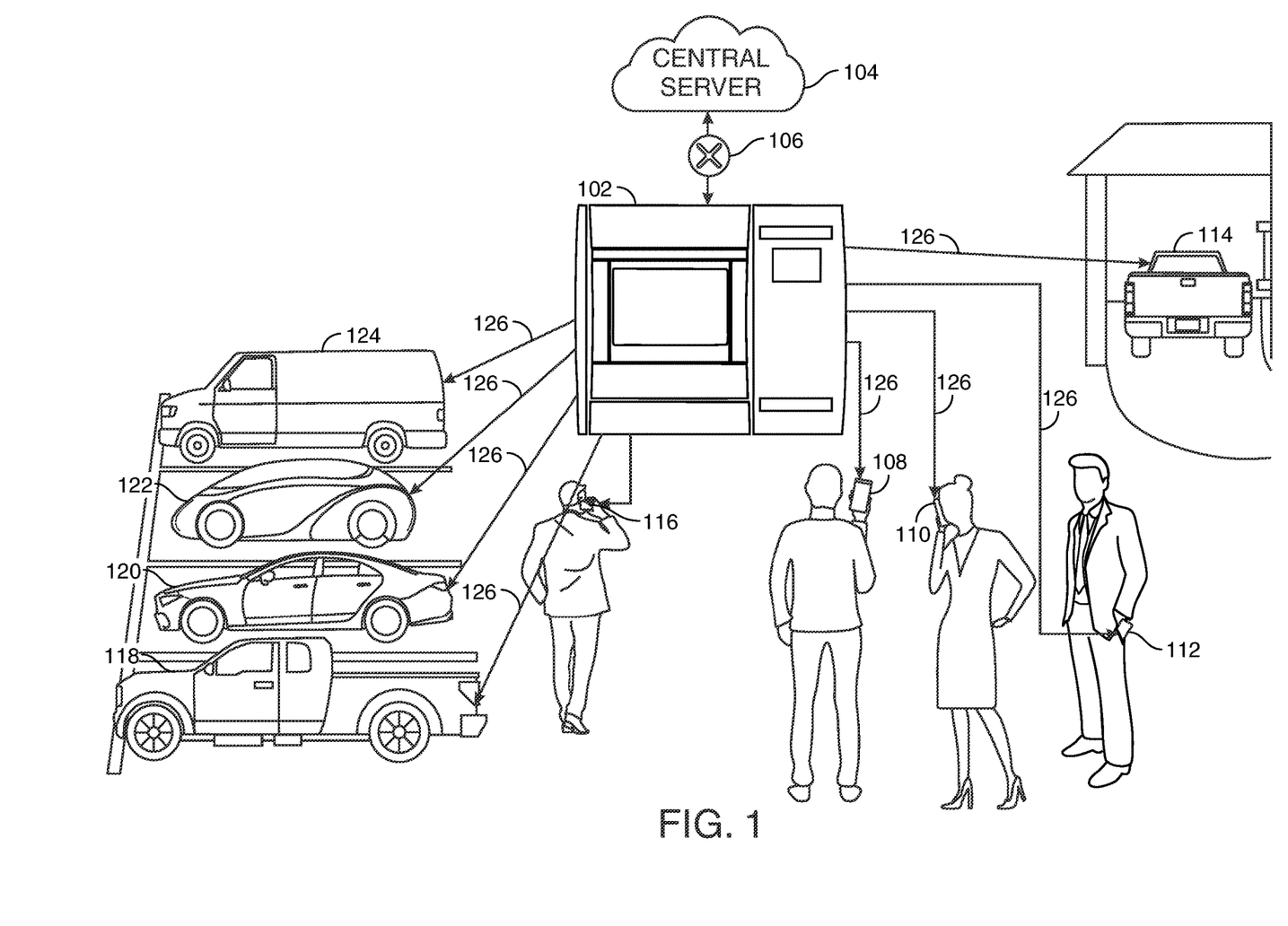
FIG. 1 shows an illustrative system architecture in accordance with principles of the disclosure.

FIG. 1 shows an illustrative diagram in accordance with principles of the disclosure. Apparatus illustrated in FIG. 1 includes an ATM 102 and a central server 104.

The apparatus illustrated in FIG. 1 also includes mobile devices positioned sufficiently close to the ATM to support short range communications with the ATM. The mobile devices may include smartphone 108, smartphone 110, smart card 112, smart car 114, smartphone 116, device 118, device 120, device 122 and device 124. Each of devices 114 and devices 118-124 may comprise a computing system run on a smart car or a mobile device positioned within the car, such as a laptop, iPad, tablet, a smartphone, or any other computing device.

The ATM may be configured to communicate with central server 104 via a wireless network communication. In the event that the ATM loses communication with central server 104, communication between ATM 102 and central server 104 may be unsupported.

ATM 102 may be enabled to receive transaction requests from customers that may be associated with a secure entity. Central server 104 may receive these transaction requests and process the transaction requests when electronic communication via the network is enabled.

In FIG. 1, ATM 102 does not support communication with central server 104. The network connection may not be established between the ATM and the central server, as shown at 106. In some embodiments, the network connection may not be established for a just a few seconds. In some embodiments, the network connection may not be established for a few minutes or a couple of hours. In other embodiments, the network connection may be disconnected for more than one day. Network connection may be disrupted due to weather conditions, construction or any other suitable occurrence.

Because the ATM does not support the network connection, the default data routing pathway for processing transactions performed at the ATM may not be enabled. The default data routing pathway may be the standard mode of processing transactions at the ATM which includes direct communication with the central server to enable updating account data within the entity based on the executed transactions.

ATM 102 may proceed to attempt to process the electronic transactions using the alternative data routing pathway. In the alternative data routing pathway, ATM 102 may attempt to leverage edge devices that are within close proximity to the ATM 102 to temporarily store transaction data associated with transaction requests. When the edge devices reach a location where network connection between the edge devices and the central server may be established, the edge devices may transmit the transaction data to the central server 104 for processing.

As illustrated, ATM 102 may attempt to establish a connection with one or more edge devices. The connection may be enabled using a short-range communication, i.e.— light fidelity ("Lifi"), Bluetooth, Zigbee or any other suitable short-range communication. ATM 102 may transmit an electronic message 126 via short-range communication to smartphone 108, smartphone 110, smart card 112, device 114, smartphone 116, device 118, device 120, device 122 and device 124. The electronic messages may be transmitted in the form of a Beacon signal, radio-waves or any other suitable method.

Figure 2:
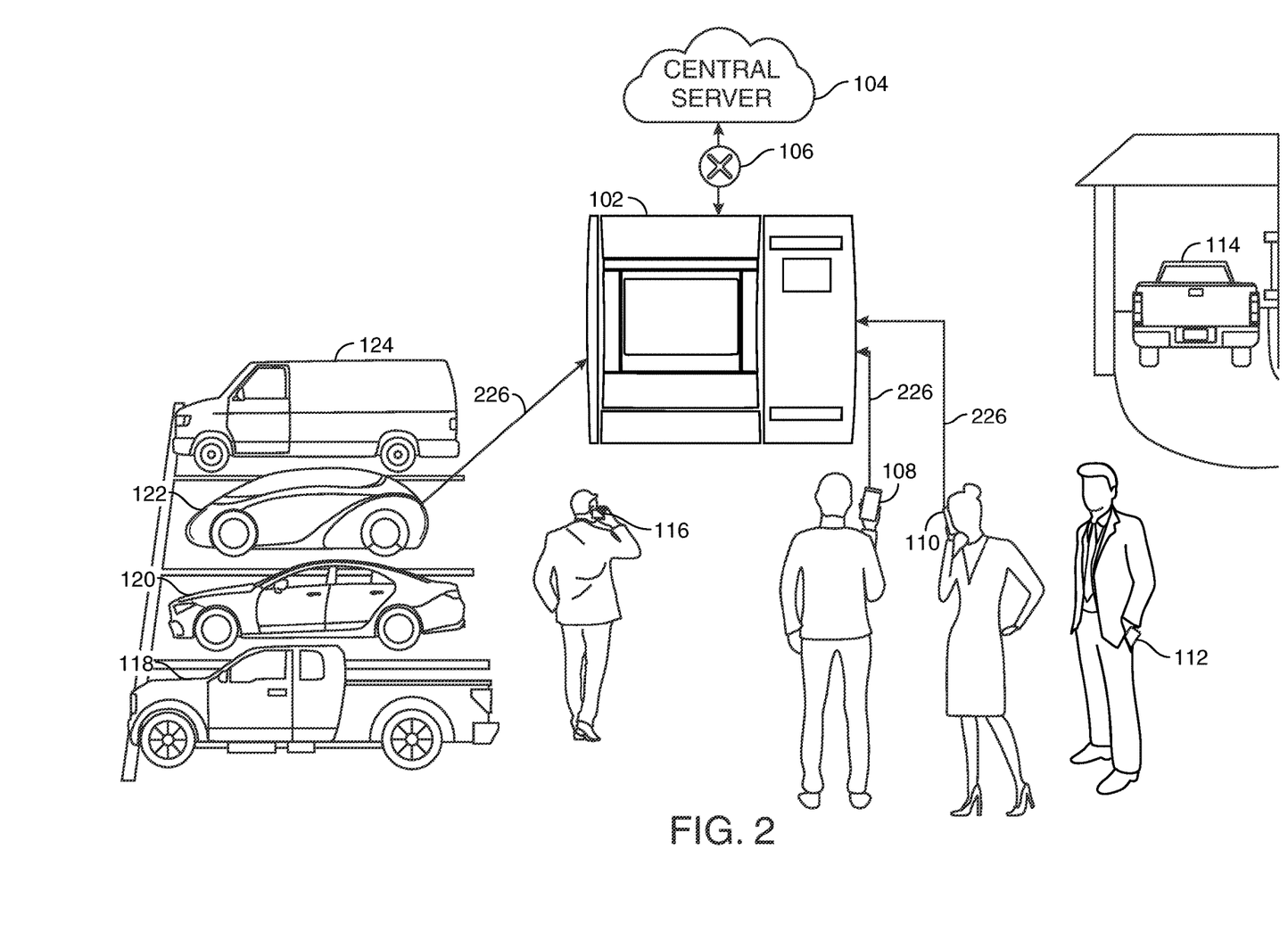
FIG. 2 shows an illustrative system architecture in accordance with principles of the disclosure.

FIG. 2 shows an illustrative diagram described above in reference to FIG. 1. In FIG. 2, smartphone 108, smartphone 110 and smart car 122 are illustrated as transmitting communications back to ATM 102, as shown at 226, in response to the short-range communication 126 illustrated in FIG. 1. As such, each of smartphone 108, smartphone 110 and smart car 122 may have successfully established electronic communication with ATM 102 using a short-range wireless network. ATM 102 may determine, based on device settings of each of devices 108, 110 and 122, whether the secure application for the secure entity is running on each of the devices. In response to the determination, ATM 102 may transmit a request to one or more of the devices that have the secure application running on the device, whether a user of the device may opt-in to enable the device to store transaction data temporarily.

Figure 3:
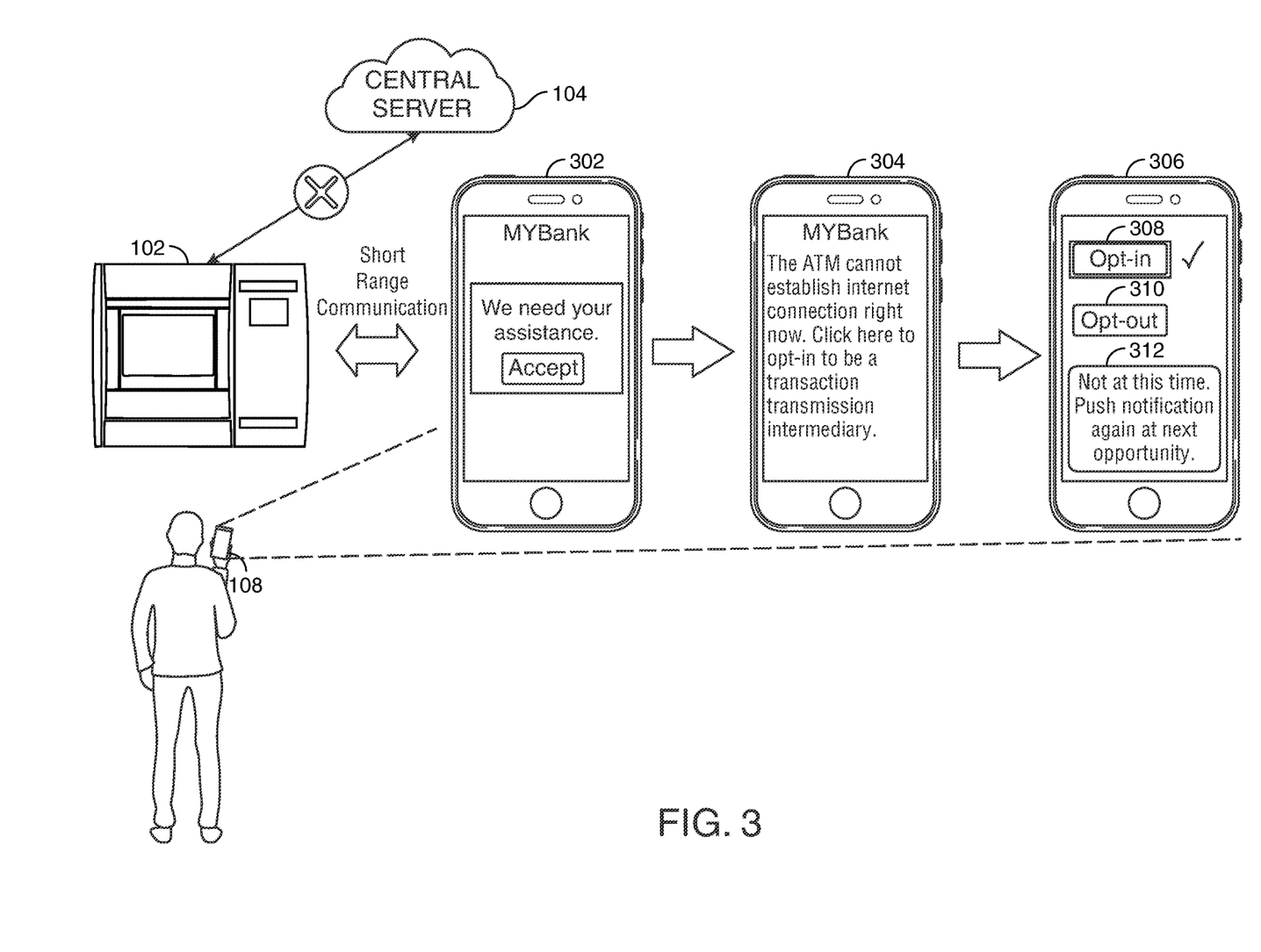
FIG. 3 shows an illustrative diagram in accordance with principles of the disclosure.

FIG. 3 shows an illustrative diagram of ATM 102 in electronic communication with smartphone 108. ATM 102 may transmit a request to smartphone 108. The request may be a request for approval from the user of smartphone 108 accepting to enable smartphone 108 to temporarily store transaction data from ATM 102 at the smartphone 108 pending re-establishment of network connection at smartphone 108.

The request may be a push notification displayed on a user interface ("UI") of smartphone 108. The request may be an email and/or text message to smartphone 108.

In this illustrative diagram, the request is transmitted as a push notification on the UI of smartphone 108. The request may be transmitted by the ATM to the secure application. The push notification may be generated by the secure application and displayed on the UI.

AT 302, the UI displays the push notification. The request is displayed within the secure application 'MyBank' interface.' The push notification displays the message 'MyBank needs your assistance.' The user of smartphone 108 may accept the push notification and view the details displayed at 304. The user of smartphone 108 may not accept the push notification and the push notification may be removed from the display after a pre-determined amount of time.

At 302, the user may select the option displayed at the UI to 'accept.' Following acceptance, UI 304 may be displayed on smartphone 108. At UI 304, the push notification displayed may display a short description for operating as the transaction transmission intermediary. Following UI 304, UI 306 may be displayed. UI 306 may display three selectable options. UI 306 may be displayed in the same display of UI 304. The first option 308, may be to opt-in to allow smartphone 108 to operate as the transaction transmission intermediary. The second option 310, may be to opt-out of the offer. The third option 312, may be to opt-out of acceptance of the request at this instance, but that the user may have an interest in the future.

At 306, selectable option 308 is selected and the smartphone is configured for receiving transaction data from the ATM 102.

Figure 4:
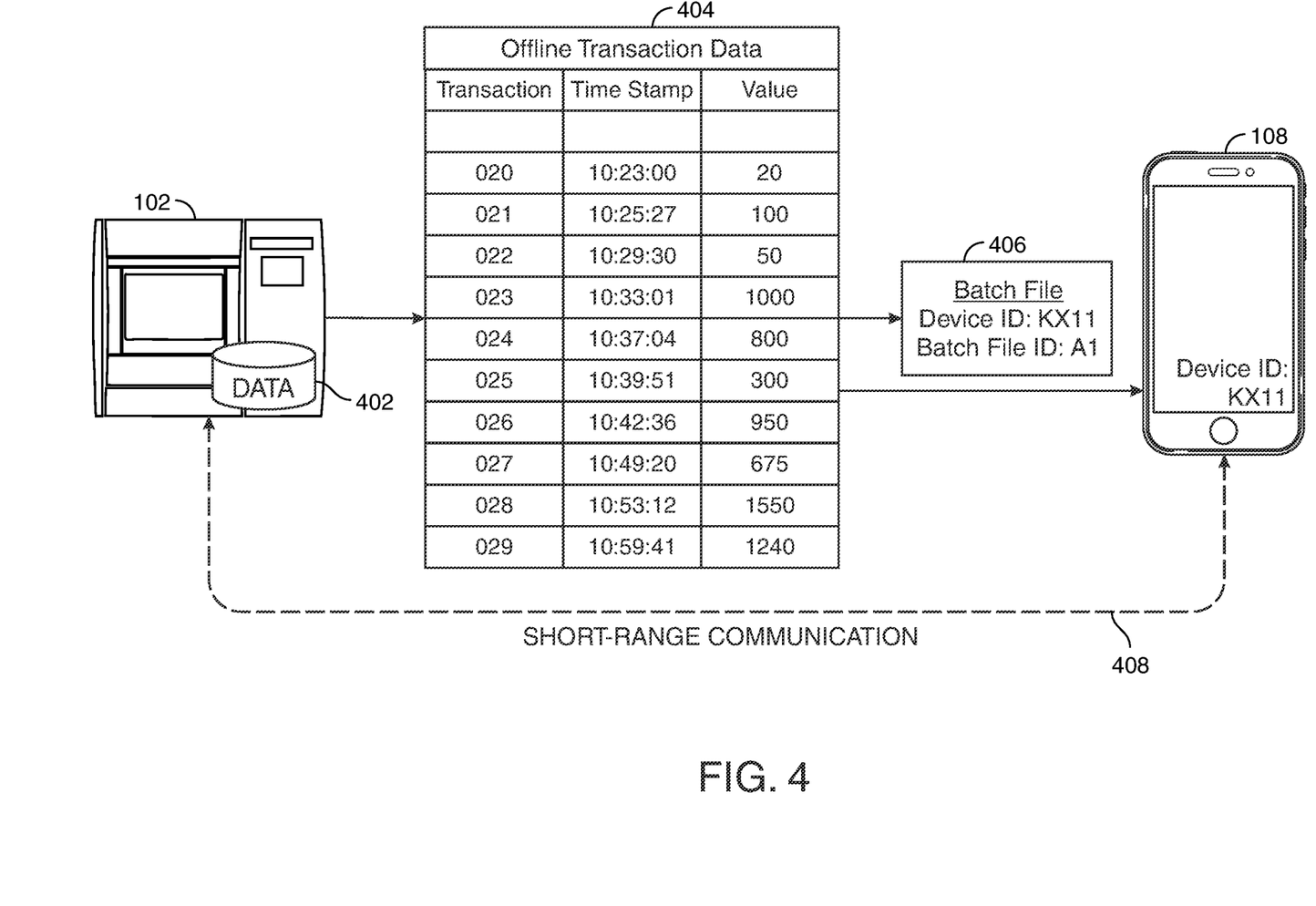
FIG. 4 shows an illustrative diagram in accordance with principles of the disclosure.

FIG. 4 shows an illustrative diagram of ATM 102 in electronic communication with smartphone 108 via short-range communication 408. The communication between ATM 102 and smartphone 108 may follow after the smartphone has been determined to opt-in to operate as the transaction transmission intermediary.

ATM 102 may retrieve offline transaction data stored in data repository 402. Offline transaction data may be data associated with each transaction request that has been received during a period of time when network connection has not been established. These transaction requests may be processed at the ATM, account data may be updated locally at the ATM and transaction data associated with each processed transaction request may be stored at data repository 402.

Each offline transaction data may include a transaction number, a timestamp of the time the transaction was executed and a value of the transaction.

ATM 102 may retrieve a device identifier associated with smartphone 108. Additionally, ATM 102 may determine the amount of available storage at smartphone 108. In the event that smartphone 108 has sufficient storage space for all offline transaction data pending for transmission to the central server, then ATM 102 may generate a batch file 406 including all offline transaction data 404. The device identifier may be tagged to the batch file.

In the event that smartphone 108 does not have sufficient storage space for all offline transaction data pending for transmission to the central server, ATM 102 may split the data and generate two or more batch files. One batch file may be transmitted to smartphone 108 and the second or more batch files may be transmitted to additional mobile devices.

In this illustrative diagram, batch file 406 may include all offline transaction data 404 that may be pending. Additionally, batch file 406 may include the device ID for smartphone 108 and a batch file identifier assigned to batch file 406.

Batch file 406 may be received at smartphone 108 and stored in memory of smartphone 108. Smartphone 108 may not be enabled to establish network connection with the central server, via the secure application while in the pre-determined range of ATM 102. Smartphone 108 may store batch file 406 until the network connection may be re-established at smartphone 108 and batch file 406 may be transmitted to the central server.

Figure 5:
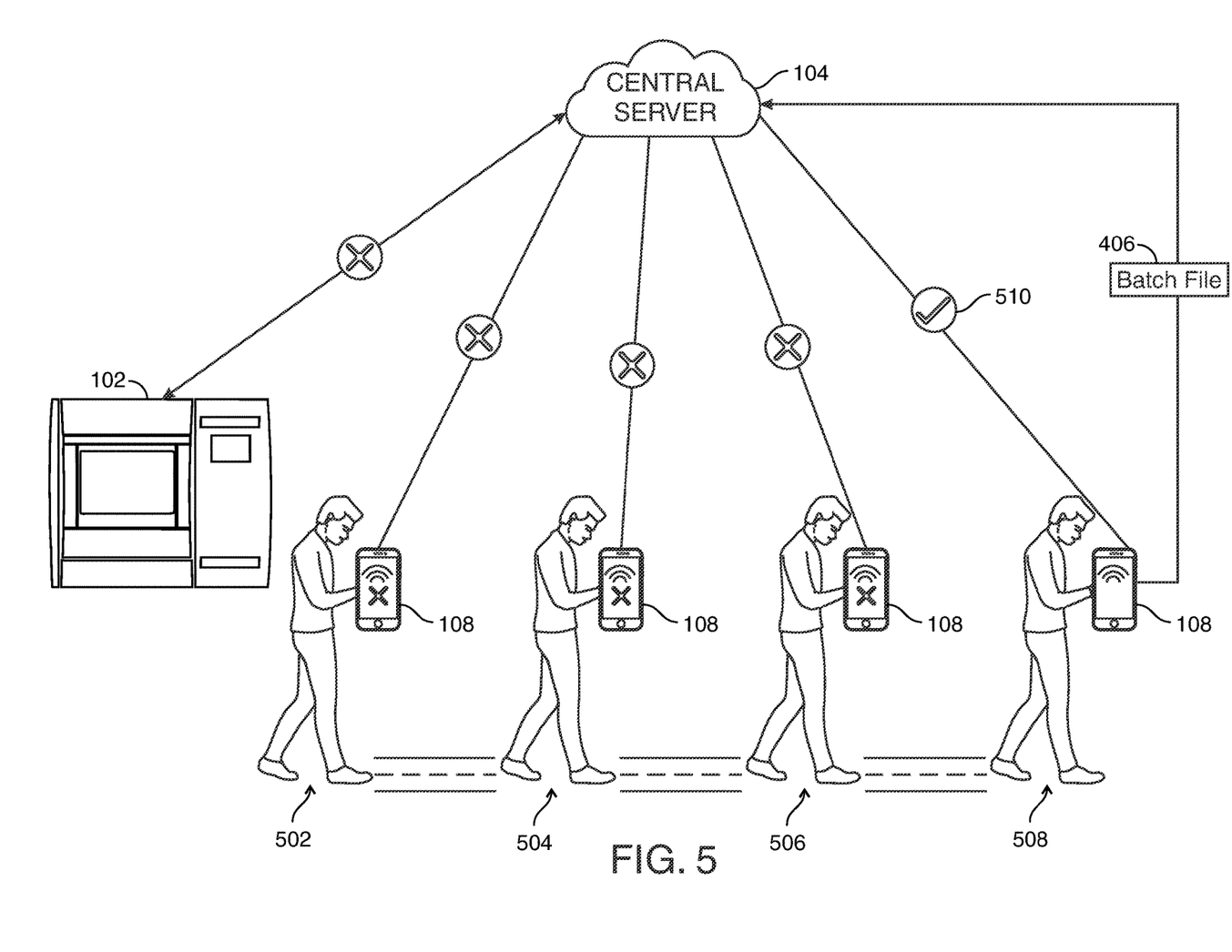
FIG. 5 shows an illustrative diagram in accordance with principles of the disclosure.

FIG. 5 shows an illustrative diagram of the process of smartphone 108 transmitting batch file 406 to the central server.

At position 502, smartphone 108 may be in close proximity to ATM 102. Network connection may not be established and ATM 102 may not be enabled to communicate with central server 104. Smartphone 108 may also not be enabled to communicate with central server 104. Because smartphone 108 is a mobile device, smartphone 108 may travel a distance away from the location of ATM 102 and reach a location where network connection may be established. When smartphone 108 reaches the location where network connection is re-established, smartphone 108 may transmit data pending at ATM 102 to central server 104 prior to ATM 102.

The distance may be a few hundred feet. The distance may be a few thousand feet. The distance may be one or more miles. The distance may be any other suitable distance.

At position 504, smartphone 108 may attempt to establish electronic communication with central server 104. Network connection may not be established at position 504 and smartphone 108 may not be enabled to communicate with central server 104.

At position 506, smartphone 108 may attempt to establish network connection with central server 104. Network connection may not be established at position 506 and smartphone 108 may not be able to communicate with central server 104.

At position 508, smartphone 108 attempts to establish connection with central server 104. Smartphone 108 may be enabled to re-establish network connection at position 508 and successfully transmit batch file 406 to central server 104.

Figure 6:
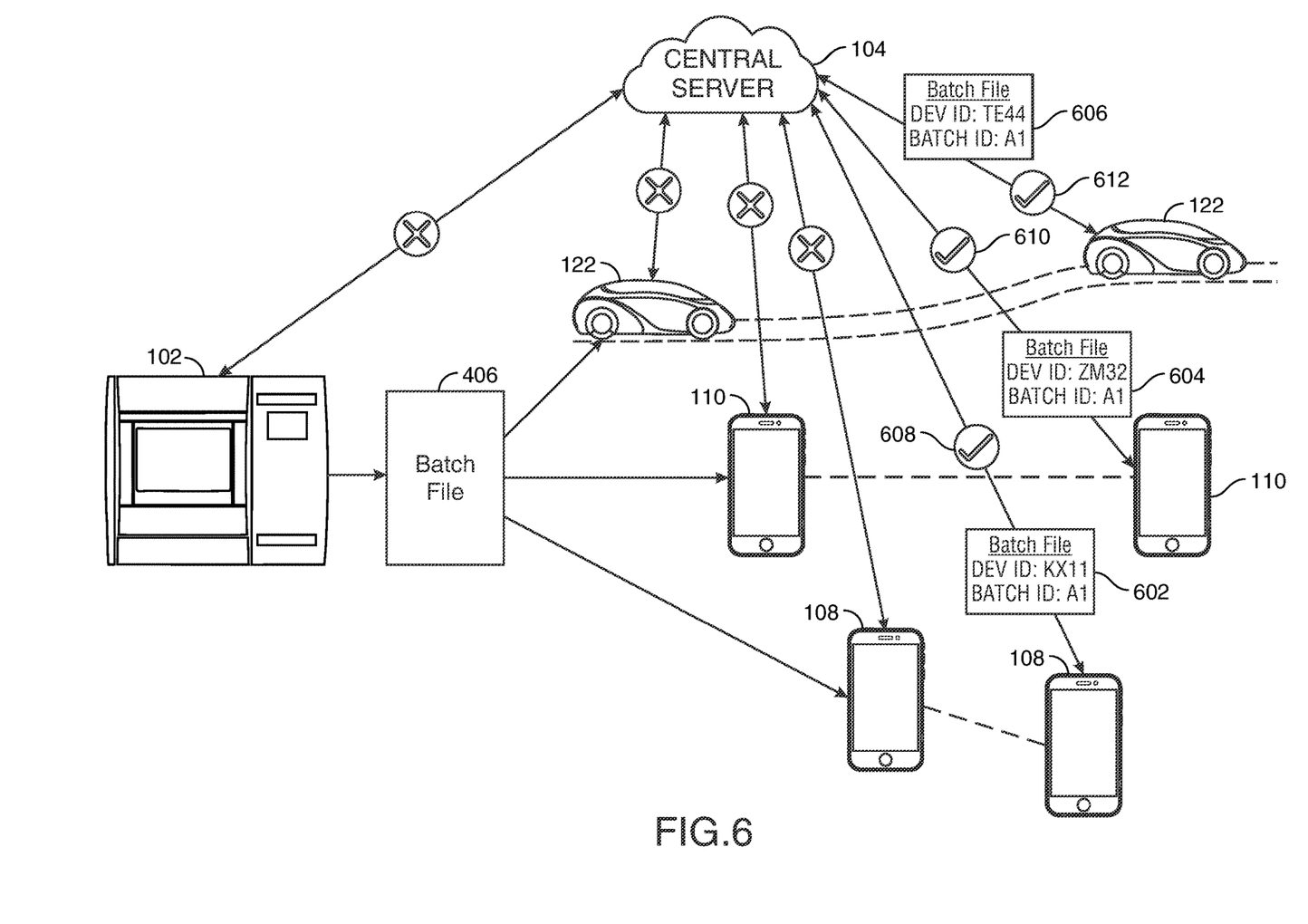
FIG. 6 shows an illustrative diagram in accordance with principles of the disclosure.

FIG. 6 shows an illustrative diagram of multiple edge devices operating as a proxy for ATM 102 for transmitting transaction data to central server 104.

Electronic communication is not available between ATM 102 and central server 104 since network connection is not able to be established.

As described in FIG. 2, smartphone 108, smartphone 110 and smart car 122 successfully established an electronic communication with ATM 102 and are each individually in electronic communication with ATM 102. Each of smartphone 108, smartphone 110 and smart car 122, may not be enabled to establish a network connection.

ATM 102 may be enabled to electronically communicate with each of smartphone 108 smartphone 110 and smart car 122 via a short-range communication because they are within close proximity to ATM 102.

ATM 102 may transmit batch file 406 to each of smartphone 108, smartphone 110 and smart car 116. Batch file 406 may be the same batch file for each of devices 108, 110 and 122. Batch file 406 may be tagged with a batch file identifier. In this exemplary diagram, batch file 406 at each device, may receive the same batch file identifier 'A1.'

A copy of batch file 406 may be stored at ATM 102. The copy of the batch file 406 may include the batch file identifier 'A1' and a device identifier of each of the mobile devices temporarily storing the batch file 406.

When batch file 406 is compiled and transmitted to smartphone 108, batch file 406 at smartphone 108 may be tagged with a device identifier associated with smartphone 108 and with the batch file identifier 'A1'.

When batch file 406 is compiled and transmitted to smartphone 110, batch file 406 at smartphone 110 may be tagged with a device identifier associated with smartphone 110 and with the batch file identifier 'A1'.

When batch file 406 is compiled and transmitted to smart car 116, batch file 406 at smart car 122 may be tagged with a device identifier associated with smart car 116 and with the batch file identifier 'A1'.

Each of smartphone 108, smartphone 110 and smart car 122 may travel a distance from ATM 102 and when in a location where network connection may be re-established, transmit the batch file to central server 104.

At a location 608, smartphone 108 successfully re-establishes network connection and batch file 602 may be transmitted to central server 104.

At a location 610, smartphone 110 successfully re-establishes network connection and batch file 604 may be transmitted to central server 104.

At a location 612, smart car 122 successfully re-establishes network connection and batch file 606 may be transmitted to central server 104.

The systems and methods described herein of generating and transmitting to two or more edge devices the same batch file may give the systems herein a robust transfer rate at least because having multiple devices carrying the same data packets may provide a greater chance that at least one of the devices will shortly connect to the central server and transmit the stored data to the central server. Methods described herein may be used by the central server to identify and remove redundant transfers if two of the two or more edge devices successfully transmit to the central serve the same batch file.

In some embodiments, ATM 102 may split batch file 406 into three batch files. A first batch file may be transmitted to smartphone 108. A second batch file may be transmitted to smartphone 110. A third batch file may be transmitted to smart car 122. In this example, each of the three batch files may receive a different batch file identifier because the data included in the batch file may not be the same.

When central server 104 receives a batch file, central server 104 may determine whether the batch file is a duplicate of a previously received batch file.

In some embodiments, smartphone 108 may reach a location of network connection prior to the smartphone 110 and smartphone 122. The first batch file may be transmitted to the central server first. When the second and/or third batch file are transmitted to the central server, the central server may determine that they are duplicates of the first batch file based on the batch file identifier.

When ATM 102 is enabled to re-establish connection to the central server prior to smartphone 108, smartphone 110 and/or smart car 122, ATM 102 may transmit the copy of the batch file 406 to the central server 104. Batch file 406 may include the batch file identifier and the device identifier of each of the mobile devices that received the batch file. Thereby, when one or more of smartphone 108, smartphone 110 and smart car 122 re-establish network connection and transmit the batch file to the central server, central server may be enabled to automatically determine whether the batch file is a duplicate based on the batch file identifier and the device identifiers.

Figure 7:
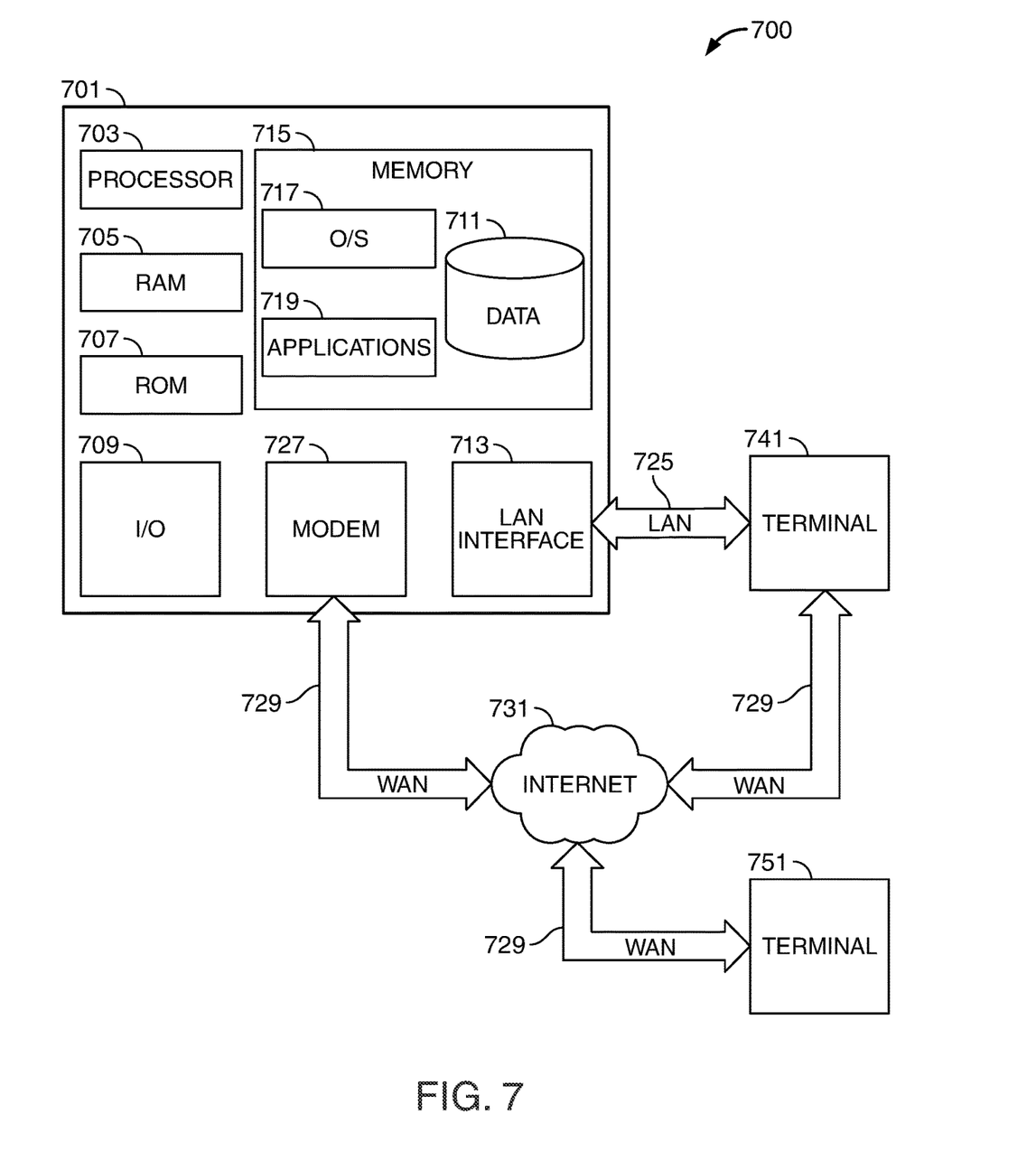
FIG. 7 shows an illustrative block diagram of apparatus in accordance with principles of the disclosure.

FIG. 7 shows an illustrative block diagram of system 700 that includes computer 701. Computer 701 may alternatively be referred to herein as an "engine," "server" or a "computing device." Computer 701 may be any computing device described herein, such as the computing devices running on the one or more of the ATM, smart phones, smart cars, smart cards and any other mobile device described herein. Elements of system 700, including computer 701, may be used to implement various aspects of the systems and methods disclosed herein.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 617 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701.

In some embodiments, computer 701 may be the ATM 102 and Terminals 741 and 751 may be the central server 104, and/or any of mobile devices 108-124 that may be in electronic communication with ATM 102 via LAN, WAN or any other suitable short-range communication when network connection 631 may not be established.

When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

In some embodiments, computer 701 may be connected to one or more other systems via a short-range communication network (not shown). In these embodiments, computer 701 may communicate with one or more other terminals 741 and 751, such as the mobile devices including mobile devices 108-124 described herein etc., using a PAN such as Bluetooth NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application program(s) 719 may include computer executable instructions (alternatively referred to as "programs"). The computer executable instructions may be embodied in hardware or firmware (not shown). The computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 719 may include one or more algorithms that may be used to implement features of the disclosure.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 8:
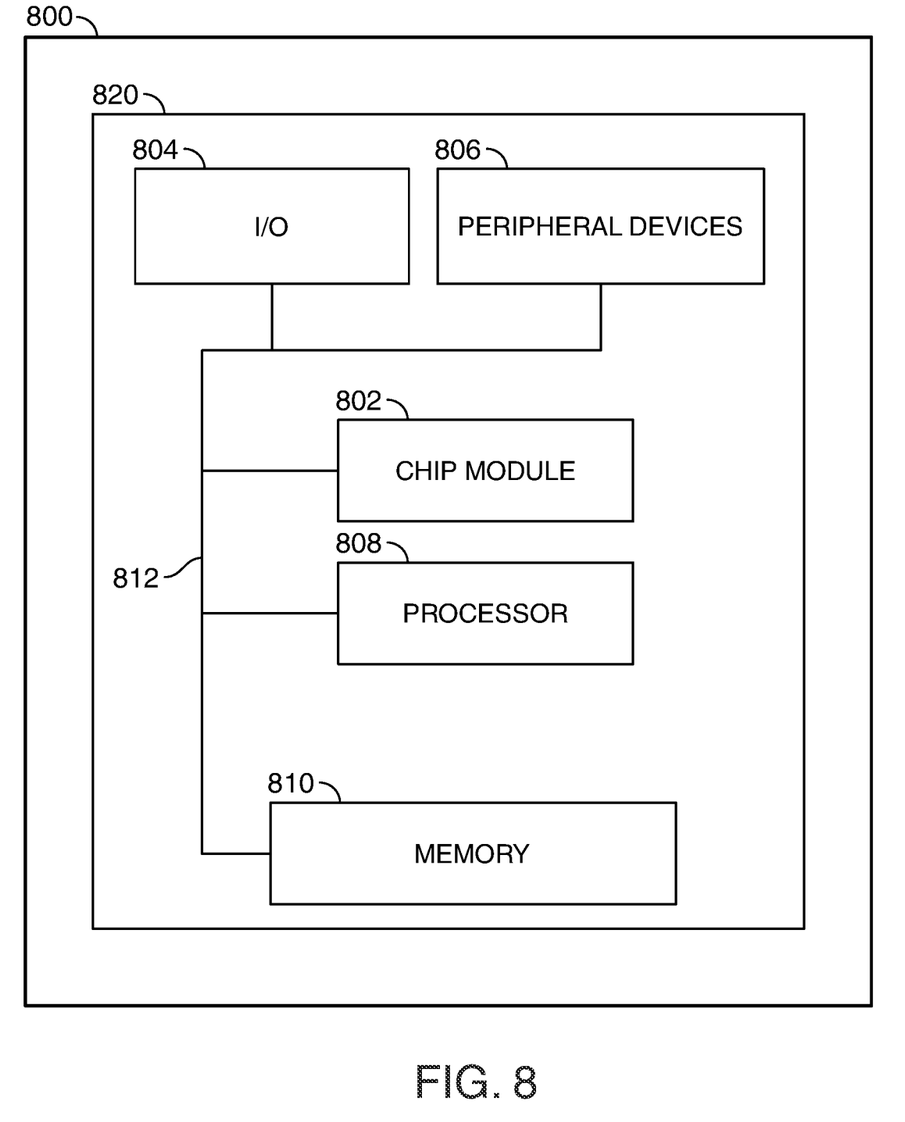
FIG. 8 shows an illustrative apparatus that may be configured in accordance with principles of the disclosure.

FIG. 8 shows illustrative apparatus 800 that may be configured in accordance with the principles of the disclosure. Apparatus 800 may be a computing device. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 719, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Thus, systems and methods for enabling an automated teller machine ("ATM") supporting a default data routing pathway, to leverage an alternative data routing pathway using edge devices for transmitting information to a central server when the ATM does not support a network connection with the central server is provided. Persons skilled in the art will appreciate that the present invention can be practiced by other than the described embodiments, which are presented for purposes of illustration rather than of limitation.

What is claimed is:

1. A method for enabling an automated teller machine ("ATM") supporting a default data routing pathway, to leverage an alternative data routing pathway using one or more mobile devices for transmitting information to a central server when a location of the ATM does not support a network connection, wherein the ATM and the central server are associated with a financial entity, the method comprising a processor on the ATM executing the steps of:

storing account data of customers of the financial entity within a local data repository of the ATM, wherein the account data comprises a profile of each customer which indicates a mobile device associated with the customer on which a secure application of the financial entity has been installed, wherein the profile also indicates that the customer has opted to pre-register the mobile device as a transaction transmission intermediary;

detecting a loss of network connection between the ATM and the central server;

processing electronic transaction requests at the ATM using offline electronic transaction protocols and storing in a local data repository, offline transaction data associated with each processed offline electronic transaction;

searching, using short-range wireless communication, for a mobile device of a customer within a pre-determined range of the ATM;

identifying, using the local data repository of the ATM and the settings of the mobile device, a pre-registered mobile device of a customer within the pre-determined range of the ATM, such that both a location of the mobile device and the location of the ATM do not support a network connection;

in response to an identification of the mobile device within the pre-determined range, transmitting a pairing request to the mobile device requesting the mobile device to allow the ATM to connect via the short-range wireless communication;

in response to authentication of the pairing request, determining if the mobile device is running the secure application on the mobile device;

when the mobile device is determined to run the secure application, requesting an approval from the mobile device, via the secure application, to perform as the transaction transmission intermediary to transport electronic transaction data generated at the ATM to the central server, the transportation being executed by the mobile device at a later point in time, when the mobile device reaches a second location where the network connection is established; and in response to a receipt of approval, performing as the transaction transmission intermediary to transport the electronic transaction data generated at the ATM to the central server by:

compiling a batch file to be transmitted to the mobile device, the compiling comprising:

generating a batch file including the offline transaction data stored in the local data repository from each processed offline electronic transaction;

tagging to the batch file:

a batch file identifier assigned to the batch file; and a device identifier associated with the mobile device; and storing a copy of the batch file at the local data repository and tagging the copy of the batch file with the device identifier and the batch file identifier;

determining that a size of the batch file is greater than an amount of available storage at the mobile device;

in response to the determining, splitting the batch file into a first batch file and a second batch file;

transmitting the first batch file to the mobile device;

storing, temporarily, the first batch file at the mobile device;

searching the pre-determined range for an additional mobile device;

identifying the additional mobile device;

requesting approval from the additional mobile device to perform as the transaction transmission intermediary, wherein the requesting for approval comprises, determining, by the ATM, that the customer associated with the additional mobile device has pre-registered to operate as the transaction transmission intermediary; and in response to receipt of approval from the additional mobile device:

transmitting the second batch file to the additional mobile device; and storing the second batch file, temporarily, at the additional mobile device; and at the later point in time when the mobile device and the additional mobile device each reach the second location where the network connection is established, transmitting the first batch file from the mobile device to the central server and the second batch file from the additional mobile device to the central server.

2. The method of claim 1 further comprising the central server performing the steps of:

receiving the first batch file from the mobile device and the second batch file from the additional mobile device;

determining, based on the device identifier and the batch file identifier of the first batch file, whether the first batch file is a duplicate batch file; and determining, based on the device identifier and the batch file identifier of the second batch file, whether the second batch file is a duplicate batch file.

3. The method of claim 1 wherein the mobile device is one of a smart card, smartphone, smartwatch, smart glasses and smart car.

4. The method of claim 1 wherein the requesting of the approval comprises:

transmitting a notification to the mobile device, the notification displaying a selectable option to accept or deny the request for approval.

5. The method of claim 1 wherein the short-range wireless communication comprises one of Bluetooth®, near-field communication ("NFC"), ZigBee® and light-fidelity ("Lifi").

6. The method of claim 5 wherein the short-range wireless communication comprises a bandwidth that enables transmission of the batch file within a pre-determined amount of time.

7. The method of claim 1 wherein the network connection between the ATM and the central server is an internet connection.

8. The method of claim 1 wherein the compiling of the batch file further comprises sorting the offline transaction data within the batch file based on a transaction value of each offline electronic transaction.

9. A system for enabling an automated teller machine ("ATM") supporting a default routing pathway, to leverage an alternative data routing pathway using one or more mobile devices for transmitting information to a central server when a location of the ATM does not support a network connection, wherein the ATM and the central server are associated with a financial entity, the system comprising:

the ATM configured to:
store account data of customers of the financial entity within a local data repository of the ATM, wherein the account data comprises a profile of each customer which indicates a mobile device associated with the customer on which a secure application of the financial entity has been installed, wherein the profile also indicates that the customer has opted to pre-register the mobile device as a transaction transmission intermediary;

detect a loss of the network connection at the ATM;

process electronic transaction requests at the ATM using offline electronic transaction protocols;

store in a local data repository, offline transaction data associated with each processed offline electronic transaction;

search, using short-range wireless communication, for a mobile device of a customer within a pre-determined range of the ATM;

identify, using the local data repository of the ATM and the settings of the mobile device, a pre-registered mobile device of a customer within the pre-determined range of the ATM, such that both a location of the mobile device and the location of the ATM do not support a network connection; and in response to an identification of a mobile device within the pre-determined range, transmit a pairing request to the mobile device, the pairing request requesting the mobile device to allow the ATM to electronically communicate with the mobile device via the short-range wireless communication;

the mobile device configured to:
receive the pairing request; and
transmit an electronic communication to the ATM authenticating the pairing request and further transmitting a device identifier associated with the mobile device to the ATM;

the ATM configured to:
determine whether the mobile device is running the secure application on the mobile device;

in response to a determination that the mobile device is running the secure application, transmit a request of approval to the mobile device to perform as the transaction transmission intermediary to transport electronic transaction data generated at the ATM to the central server, the transportation being executed by the mobile device at a later point in time, when the mobile device reaches a second location where the network connection is established; and in response to a receipt of approval, perform as the transaction transmission intermediary to transport the electronic transaction data generated at the ATM to the central server by:

compiling a batch file for transmitting to the mobile device, the compiling comprising:

generating a batch file including the offline transaction data stored in the local data repository from each processed offline electronic transaction;

tagging to the batch file, a batch file identifier and a device identifier associated with the mobile device;

storing a copy of the batch file at the local data repository and further tagging to the copy of the batch file, the batch file identifier and the device identifier;

determining that a size of the batch file is greater than an amount of available storage at the mobile device;

in response to the determining, splitting the batch file into a first batch file and a second batch file;

transmitting the first batch file to the mobile device;

storing, temporarily, the first batch file at the mobile device;

searching the pre-determined range for an additional mobile device;

identifying the additional mobile device;

requesting approval from the additional mobile device to perform as the transaction transmission intermediary, wherein the requesting for approval comprises, determining by the ATM, that the customer associated with the additional mobile device has pre-registered to operate as the transaction transmission intermediary; and in response to receipt of approval from the additional mobile device:

transmitting the second batch file to the additional mobile storing the second batch file, temporarily, at the additional device; and mobile device;

the mobile device configured to:
receive the first batch file; and
temporarily store the first batch file within local storage at the mobile device while network connection is not supported between the mobile device and the ATM; and the additional mobile device configured to:
receive the second batch file; and temporarily store the second batch file within local storage at the additional mobile device while network connection is not supported between the additional mobile device and the ATM; and at the later point in time when the mobile device and the additional mobile device each reach the second location where the network connection is established, transmitting the first batch file from the mobile device to the central server and the second batch file from the additional mobile device to the central server.

10. The system of claim 9 wherein following the transmitting of the first batch file and the second batch file to the central server, the central server is configured to:

receive the first batch file from the mobile device;

receive the second batch file from the additional mobile device;

determine, based on the device identifier and the batch file identifier of the first batch file, whether the first batch file is a duplicate batch file;

determine, based on the device identifier and the batch file identifier of the second batch file, whether the second batch file is a duplicate batch file;

when the first batch file is determined to be the duplicate batch file, purge the first batch file;

when the second batch file is determined to be the duplicate batch file, purge the second batch file;

when the first batch file is determined to be an original batch file, extract each offline transaction data from the first batch file and update account data associated with each of the offline transaction data; and when the second batch file is determined to be an original batch file, extract each offline transaction data from the second batch file and update account data associated with each of the offline transaction data.

11. The system of claim 9 wherein the mobile device is one of a smart card, smartphone, smartwatch, smart glasses and smart car.

12. The system of claim 9 wherein the requesting of the approval comprises, transmitting a notification to the mobile device, the notification displaying a selectable option to accept or deny the approval request.

13. The system of claim 9 wherein the short-range wireless communication comprises one of Bluetooth®, near-field communication ("NFC"), ZigBee® and light-fidelity ("Lifi").

* * * * *